United States Patent [19]

Cilano

[11] Patent Number: 5,415,599
[45] Date of Patent: May 16, 1995

[54] GEAR MOUNTING SYSTEM FOR DIFFERENTIAL

[75] Inventor: Joseph E. Cilano, Bergen, N.Y.

[73] Assignee: Zexel-Gleason USA, Inc., Rochester, N.Y.

[21] Appl. No.: 58,480

[22] Filed: May 6, 1993

[51] Int. Cl.⁶ ............................................. F16H 1/42
[52] U.S. Cl. .................................................... 475/252
[58] Field of Search ........................ 475/252, 248, 249

[56] References Cited

U.S. PATENT DOCUMENTS

| | | |
|---|---|---|
| 1,938,649 | 12/1933 | Welsh . |
| 2,651,215 | 9/1953 | Schoenrock . |
| 2,754,694 | 7/1956 | Schoenrock .................... 475/252 |
| 2,789,446 | 4/1957 | Schoenrock . |
| 2,859,641 | 11/1958 | Gleasman . |
| 2,972,265 | 2/1961 | Walter . |
| 3,292,456 | 12/1966 | Saari . |
| 3,375,736 | 4/1968 | Saari ............................. 475/252 |
| 3,706,239 | 12/1972 | Myers . |
| 3,738,192 | 6/1973 | Belansky et al. . |
| 4,365,524 | 12/1982 | Dissett et al. . |
| 4,677,876 | 7/1987 | Dissett . |
| 4,950,215 | 8/1990 | Korner et al. .................. 475/252 |
| 5,055,096 | 10/1991 | Riemscheid et al. . |
| 5,122,101 | 6/1992 | Tseng . |
| 5,147,252 | 9/1992 | Mace et al. . |
| 5,169,370 | 12/1992 | Dye et al. . |
| 5,292,291 | 3/1994 | Ostertag . |
| 5,295,923 | 3/1994 | Takefuta ......................... 475/252 |

FOREIGN PATENT DOCUMENTS

| | | |
|---|---|---|
| 0130806 | 1/1985 | European Pat. Off. . |
| 0148641 | 7/1985 | European Pat. Off. . |
| 2216485 | 8/1974 | France . |
| 97346 | 6/1984 | Japan ............................. 475/249 |
| 312247 | 11/1992 | Japan ............................. 475/252 |
| 323933 | 1/1930 | United Kingdom ............. 475/252 |
| 2212231 | 7/1989 | United Kingdom . |
| 2234791 | 2/1991 | United Kingdom . |

Primary Examiner—Edward K. Look
Assistant Examiner—James A. Larson
Attorney, Agent, or Firm—Eugene Stephens & Associates

[57] ABSTRACT

A new gear mounting system for a parallel-axis gear differential includes three pedestals (14) that are spaced apart between an equal number of pairs of planet gears (32 and 34). Each of the pedestals includes two bearing surfaces (52 and 54) for rotationally supporting outside cylinder surfaces of the planet gear members (32 and 34) of adjacent pairs. Similar pedestals (74) can be made pivotable for increasing frictional resistance to differentiation.

25 Claims, 7 Drawing Sheets

GEAR MOUNTING SYSTEM FOR DIFFERENTIAL

FIELD OF INVENTION

The invention relates to automotive differentials having planetary gears mounted within housings and to arrangements of bearing surfaces for supporting the planetary gears within the housings.

BACKGROUND

A typical automotive differential includes a compound planetary gear set mounted within a housing. The planetary gear set interconnects a pair of output shafts for rotation in opposite directions with respect to the housing. Engine power rotates the housing about a common axis of rotation shared by the output shafts.

The planetary gear set is generally arranged to permit the output shafts to rotate by equal amounts but in opposite directions with respect to the housing. Accordingly, the housing rotates about the common axis of the output shafts at the average speed of the two output shafts. Drive torque is distributed between the two relatively rotating output shafts in accordance with the efficiency of the planetary set.

Sun gear members of the planetary set, also referred to as "side gears", are coupled to inner ends of the output shafts. Planet gear members of the same set operatively connect the two side gears for rotation in opposite directions. Ordinarily, the sun gear members are bevel gears, and the planet gear members are bevel pinions that mesh with both side gears.

However, such bevel gear planetary gear sets are relatively efficient (i.e., only small torque differences can be supported between the output shafts), and this limits the total amount of drive torque that can be delivered to the drive shafts under uneven traction conditions. For example, if drive wheels coupled to the output shafts have uneven amounts of traction, the total drive torque is limited to a little more than two times the amount of drive torque that can be delivered to the drive wheel having less traction.

A wide variety of differential modifications and alternative differential designs have been proposed to make better use of the total traction available to both drive wheels. For example, spring-loaded clutch packs have been used to provide a predetermined minimum resistance to relative rotation between drive shafts (i.e., differentiation). However, the minimum resistance opposes differentiation even when no drive torque is being delivered to the output shafts and yet may provide too little resistance to differentiation when more drive torque is delivered.

Worm gearing has been used in gear differentials to develop considerable frictional resistance to differentiation as a relatively constant proportion of the total drive torque. This torque proportioning characteristic is more commonly expressed as a "bias ratio" which is a ratio of the respective amounts of torque in the two output shafts. Worm gear differentials, such as the one disclosed in U.S. Pat. No. 2,859,641 to Gleasman, generally exhibit bias ratios of 3.5 to 1 or greater over a wide range of total drive torque.

Parallel-axis gearing, such as spur and helical gearing, has also been used in gear differentials to develop frictional resistance to differentiation as a smaller proportion of the total drive torque. For example, U.S. Pat. No. 3,706,239 to Myers discloses a parallel-axis gear differential of a type that exhibits bias ratios of 2.5 to 1 or less.

However, bias ratios within a range of between 2.5 to 1 and 3.5 to 1 are now preferred for many automotive applications. Bias ratios of at least 2.5 to 1 are preferred for delivering sufficient amounts of additional drive torque under uneven traction conditions. In contrast, bias ratios greater than 3.5 to 1 are generally not needed to compensate for traction differences between drive wheels and can interfere with desired differentiation in turns.

To provide bias ratios within the range of 2.5 to 1 to 3.5 to 1, attempts have been made to reduce the bias ratios of worm gear differentials and to increase the bias ratios of parallel-axis gear differentials. For example, the bias ratios of worm gear differentials have been modestly reduced by increasing the side gear lead angles and by using friction reducing washers at gear end faces.

U.S. Pat. No. 5,169,370 to Dye et al. of the present assignee proposes to increase the bias ratio of a parallel-axis gear differential by dividing the planet gears into two gear portions having opposite hand helix angles that increase axial thrust of the planet gears. Although this approach increases bias ratio, the cost of producing the planet gears is also significantly increased.

An alternative approach to increasing bias ratio in a parallel-axis gear differential is proposed in United Kingdom Patent Application 2,234,791. Pairs of planet gears are distributed asymmetrically about the side gears so that a radial force urges the side gears into a frictional engagement with the housing. This approach limits the size or number of planet gears that can be used to operatively connect the side gears, adds to housing complexity, and subjects the housing to uneven distortions.

SUMMARY OF INVENTION

My invention increases the range of bias ratios that can be effectively and economically supported by parallel-axis gear differentials. Pairs of planet gears are mounted between pedestals that have bearing surfaces for supporting circumferences of planet gears. The bearing surfaces contact the planet gear circumferences in predetermined positions that vary reactionary forces of the bearings against the planet gears.

One version of my invention has the bearing surfaces formed in fixed pedestals. The bearing surfaces encompass limited portions of the planet gear circumferences for producing reactionary forces that are angularly inclined to outward directions of planet gear movement induced by their respective meshes. The reactionary forces increase in magnitude as a function of their angular difference from the directions of planet gear movement and include respective components that urge the planet gear members of each pair into positions of zero backlash.

Another version of my invention allows the pedestals to pivot about axes that are parallel to the rotational axes of the planet gears. The pivoting movements of the pedestals decrease center distances between the planet gear members of the pairs and apply braking forces against the circumferences of the planet gears. In other words, the pairs of planet gears are squeezed together between adjacent pedestals. The magnitudes of the braking forces are functions of the torques conveyed by the planet gears.

Yet another version of my invention for applying a braking torque against the planet gears surrounds the pedestals with a casing having a cylindrical bearing surface. One bearing surface of each pedestal is pivotable in an angular direction that allows one planet gear member of the pairs to engage the cylindrical bearing surface of the casing, and the other bearing surface of each pedestal is pivotable in the same angular direction to urge the other planet gear member into a position of zero backlash with a mating side gear. The casing also allows the pedestals to be alternatively formed with individually pivotable legs for separately engaging the planet gear members of the pairs.

My invention is particularly suitable for use with parallel-axis gear differentials, such as disclosed in U.S. Pat. No. 5,122,101 to Tseng of the present assignee. The planet gears have a main gear section that meshes with one of the side gears and two transfer gear sections that mesh with another planet gear. The transfer gear-to-side gear meshes straddle the transfer gear-to-transfer gear meshes along a common axis of the side gears. The bearing surfaces of the pedestals can extend along the entire axial lengths of the planet gears or can be limited to the respective lengths of the two transfer gear sections of each planet gear.

DRAWINGS

DETAILED DESCRIPTION

Figure 1:
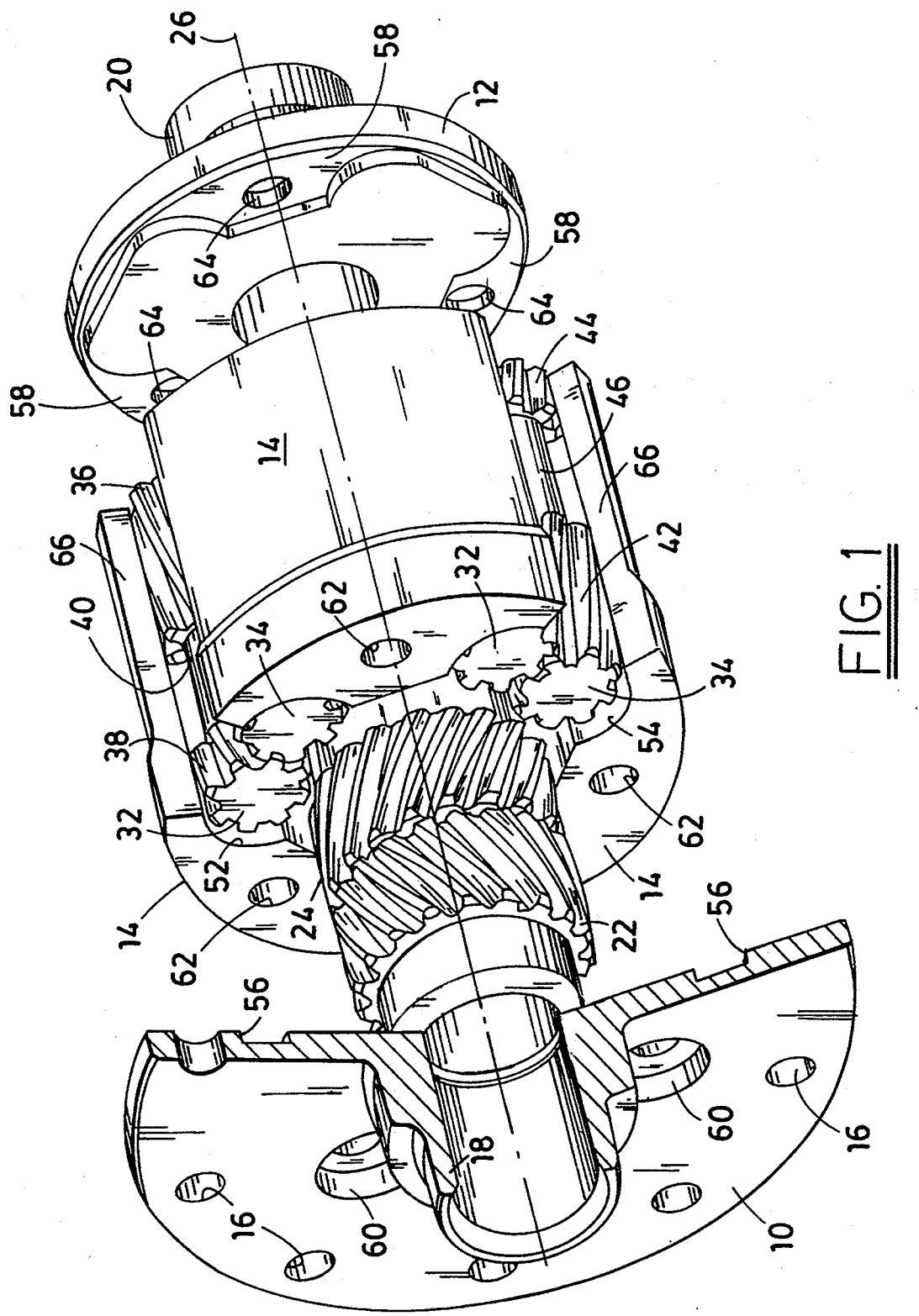
FIG. 1 is an exploded view of one embodiment of my gear mounting system having fixed pedestals for supporting pairs of planet gears.
Figure 2:
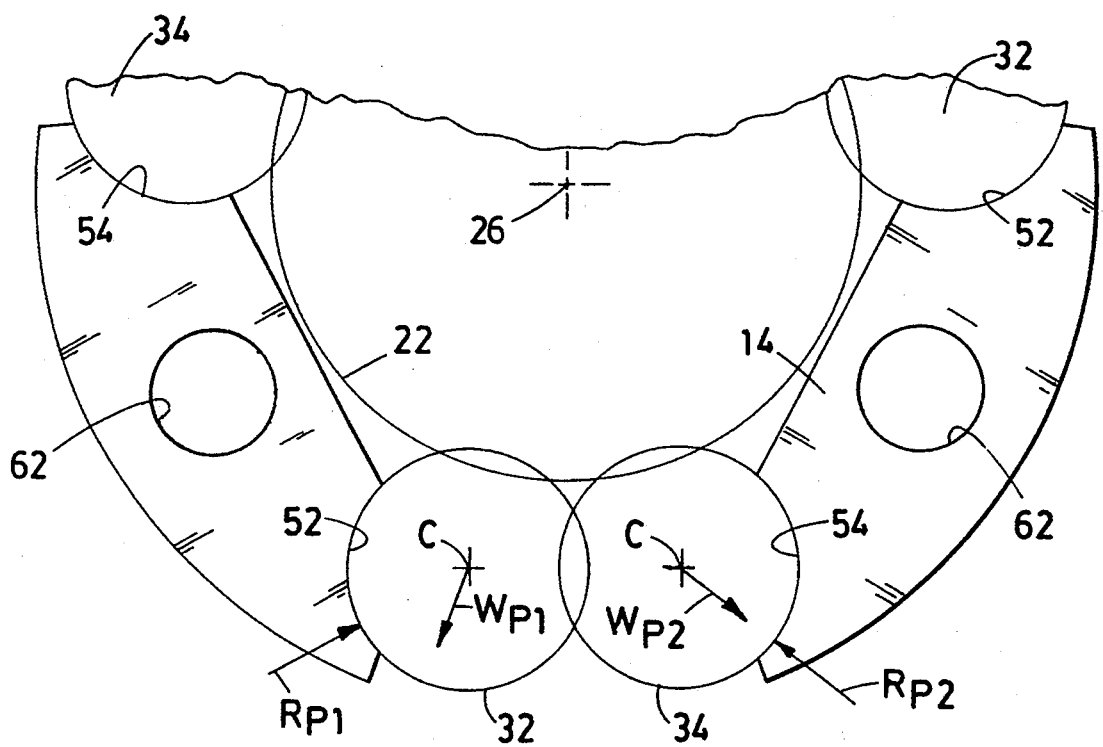
FIG. 2 is a schematic representation of an axial sectional view through a portion of the gear mounting system of FIG. 1 showing reactions between the planet gears and the fixed pedestals.
Figure 3:
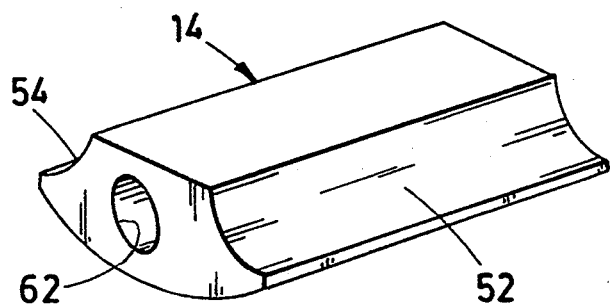
FIG. 3 is a perspective view of one of the pedestals.

My new gear mounting system for parallel-axis gear differentials is shown in FIGS. 1-3 as a housing assembly having a flange 10 and a cap 12 joined by three equally spaced pedestals 14. Mounting holes 16 provide openings for bolting a ring gear (not shown) to the flange 10 for transmitting engine power to the housing assembly. Respective trunnions 18 and 20 provide bearing surfaces for a pair of drive shafts (not shown) that transmit the engine power to vehicle wheels (also not shown).

A pair of side gears 22 and 24 are respectively coupled to the drive shafts for rotation about a common axis 26. Although only two pairs are visible in FIG. 1, three pairs of planet gears, each pair having members 32 and 34, interconnect the side gears 22 and 24 for rotation in opposite directions about the common axis 26. Each of planet gear members 32 and 34 includes a main gear section 36 or 42 and a transfer gear section 38 or 44 separated by a stem section 40 or 46.

The main gear section 36 of planet gear member 32 meshes with both the side gear 24 and the transfer gear section 44 of its mating planet gear member 34. Similarly, the main gear section 42 of planet gear member 34 meshes with both the side gear 22 and the transfer gear section 38 of its mating planet gear member 32. Thus, each of the planet gear members 32 and 34 includes one mesh with either of the side gears 22 or 24 and two meshes with each other. The stem sections 40 and 46 provide clearance for limiting meshing engagements of the planet gear members 32 and 34 to one or the other of the side gears 22 and 24.

The pairs of planet gear members 32 and 34 are mounted for rotation between adjacent pedestals 14 within respective bearing surfaces 52 and 54 that contact outside cylinder surfaces of the planet gear members 32 and 34. Opposite ends of the pedestals 14 fit within complementarily shaped recesses 56 and 58 formed in the flange 10 and the cap 12. Three sets of axially aligned bolt holes 60, 62, and 64 respectively formed through the flange 10, the pedestals 14, and the cap 12 provide necessary clearance for bolting the housing assembly together with conventional nuts and bolts (not shown). The recesses 56 and 58 prevent the pedestals 14 from pivoting about the bolts.

As best seen in the schematic view of FIG. 2, the bearing surfaces 52 and 54, which share a substantially common center of curvature "C" with the planet gear members 32 and 34, encompass only limited portions of the outside cylinder surfaces of the planet gear members 32 and 34. Gear thrust forces "$W_{p1}$", and "$W_{p2}$", generated by the respective meshes of each planet gear member, urge the planet gears 32 and 34 into contact with the bearing surfaces 52 and 54. Reactionary forces "$R_{p1}$" and "$R_{p2}$", applied by the respective bearing surfaces 52 and 54, limit movement of the planet gear members 32 and 34.

Preferably, the bearing surfaces 52 and 54 encompass less than one-half of the circumferences of the planet gear members 32 and 34 in positions that urge the planet gear members 32 and 34 into positions of zero backlash. The planet gear members 32 and 34 are urged into positions of zero backlash by reactionary forces (e.g., $R_{p1}$) that are inclined with respect to gear thrust forces (e.g., $W_{p1}$). Frictional resistance to rotation of the planet gear members 32 and 34 increases as a function of the respective angular differences between the gear thrust forces $W_{p1}$ and $W_{p2}$ and the bearing reactionary forces $R_{p1}$ and $R_{p2}$. Small variations in the curvatures of the bearing surfaces 52 and 54 can be used to better control positions of contact between the planet gear members 32 and 34 and the bearing surfaces 52 and 54.

Although frictional resistance to rotation of the planet gear members 32 and 34 is desirable for increasing bias ratios, high concentrations of heat between the bearing surfaces 52 and 54 and the planet gear members 32 and 34 need to be avoided to prevent excessive wear of the bearing surfaces 52 and 54. Accordingly, the pedestals 14 are spaced apart to form large windows 66 (see FIG. 1) that conduct flows of lubricant to the bearing surfaces 52 and 54 for dissipating heat. The windows 66 together with the pedestals 14 reduce the diameter of the housing assembly along with its weight. Also, the pedestals 14 can be made of a material different from the flange 10 and the cap 12 to increase wear resistance of the pedestals 14.

Figure 4:
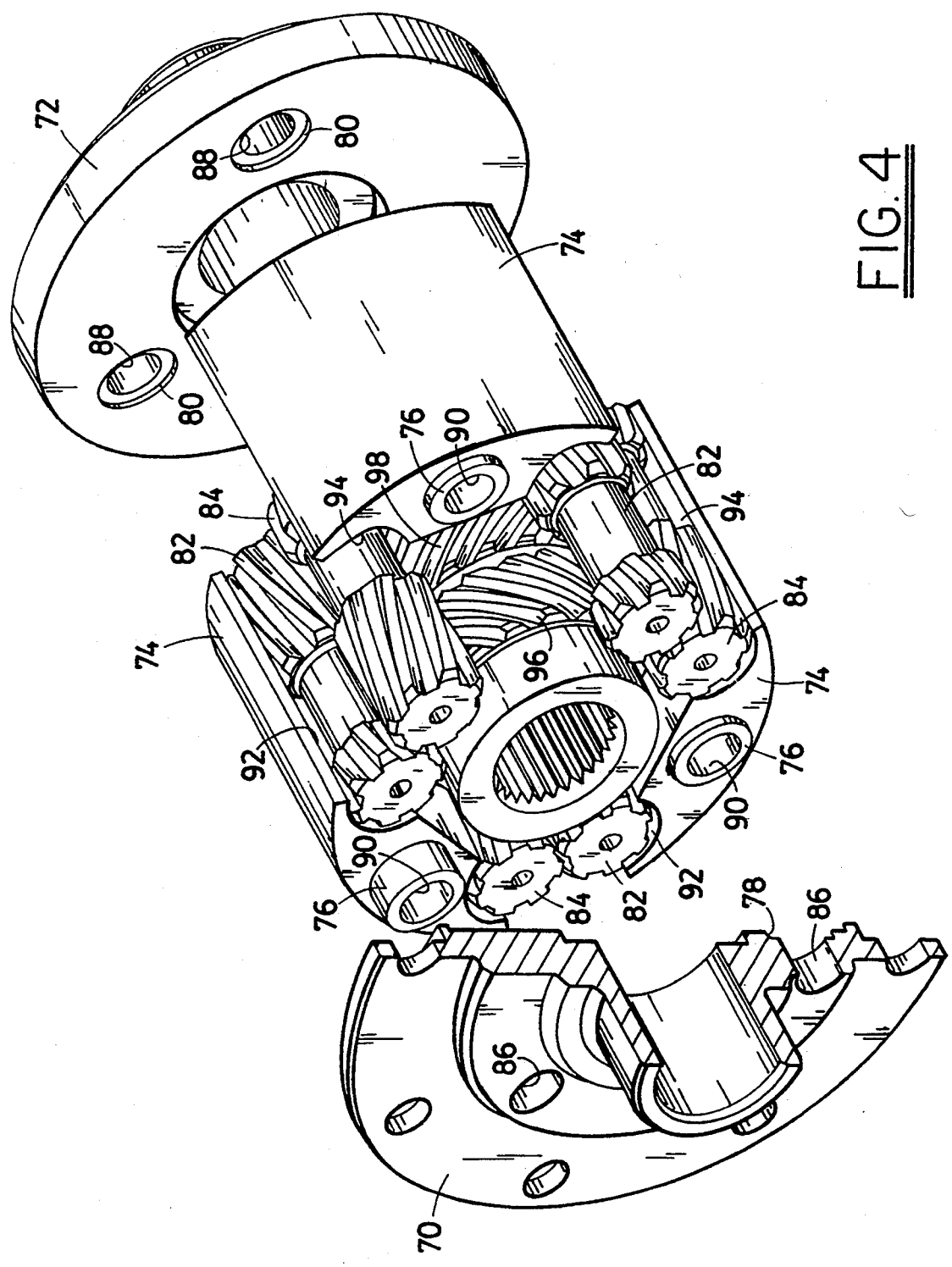
FIG. 4 is an exploded view of a second embodiment of my gear mounting system having pedestals that are pivotable for increasing resistance to differentiation.

Additional frictional resistance to differentiation is developed by the embodiment illustrated in FIG. 4. Similar to the preceding embodiment, the gear mounting system includes a flange 70, a cap 72, and three pedestals 74. However, the pedestals 74 are pivotally mounted on hollow pins 76 that maintain a predetermined spacing between the flange 70 and the cap 72.

Opposite ends of the hollow pins 76 are received within recesses 78 and 80 of the flange 70 and the cap 72 for locating the pedestals 74 in predetermined positions between pairs of planet gear members 82 and 84. Bolt holes 60 and 62 of the flange 70 and the cap 72 are aligned together with hollow portions 90 of the pins 76 for receiving through bolts (not shown). Alternatively, opposite ends of the hollow portions 90 of the pins could be threaded for receiving separate sets of bolts through the flange 70 and the cap 72.

The hollow pins 76 are made sufficiently strong to transmit engine power through the differential to drive wheels (not shown). In addition, the hollow pins 76 have an axial length sufficient to provide clearances between opposite ends of the pedestals 74 and each of the flange 70 and the cap 72 for piloting the pedestals 74.

The planet gear members 82 and 84 are rotationally supported by respective bearing surfaces 92 and 94 of adjacent pedestals 74. The uneven gear thrust forces $W_{p1}$ and $W_{p2}$, referred to in the preceding embodiment, cause all three of the pedestals 74 to pivot in a common angular direction about the hollow pins 76 for exerting leveraged squeezing forces against outside cylindrical surfaces of the planet gear members 82 and 84. Movement of the pedestals 74 in the common angular direction reduces backlash between the planet gear members 82 and 84 of each pair and between one of the planet gear members 82 and 84 of each pair and one of two side gears 96 and 98.

The portions of the outside cylindrical surfaces of the planet gears 82 and 84 encompassed by the bearing surfaces 92 and 94 are preferably limited to less than one-half of the circumferences of the planet gear members 82 and 84. However, the bearing surfaces 92 and 94 are positioned to prevent the planet gear members 82 and 84 of one pair from being disengaged from each other and the side gears 96 and 98 due to angular movements of adjacent pedestals 74 in opposite directions. The opposite angular movements of the pedestals 74 are limited by the available backlash between planet gear members 82 and 84 of the other pairs and between these same planet gear members 82 and 84 and the side gears 96 and 98.

Figure 5:
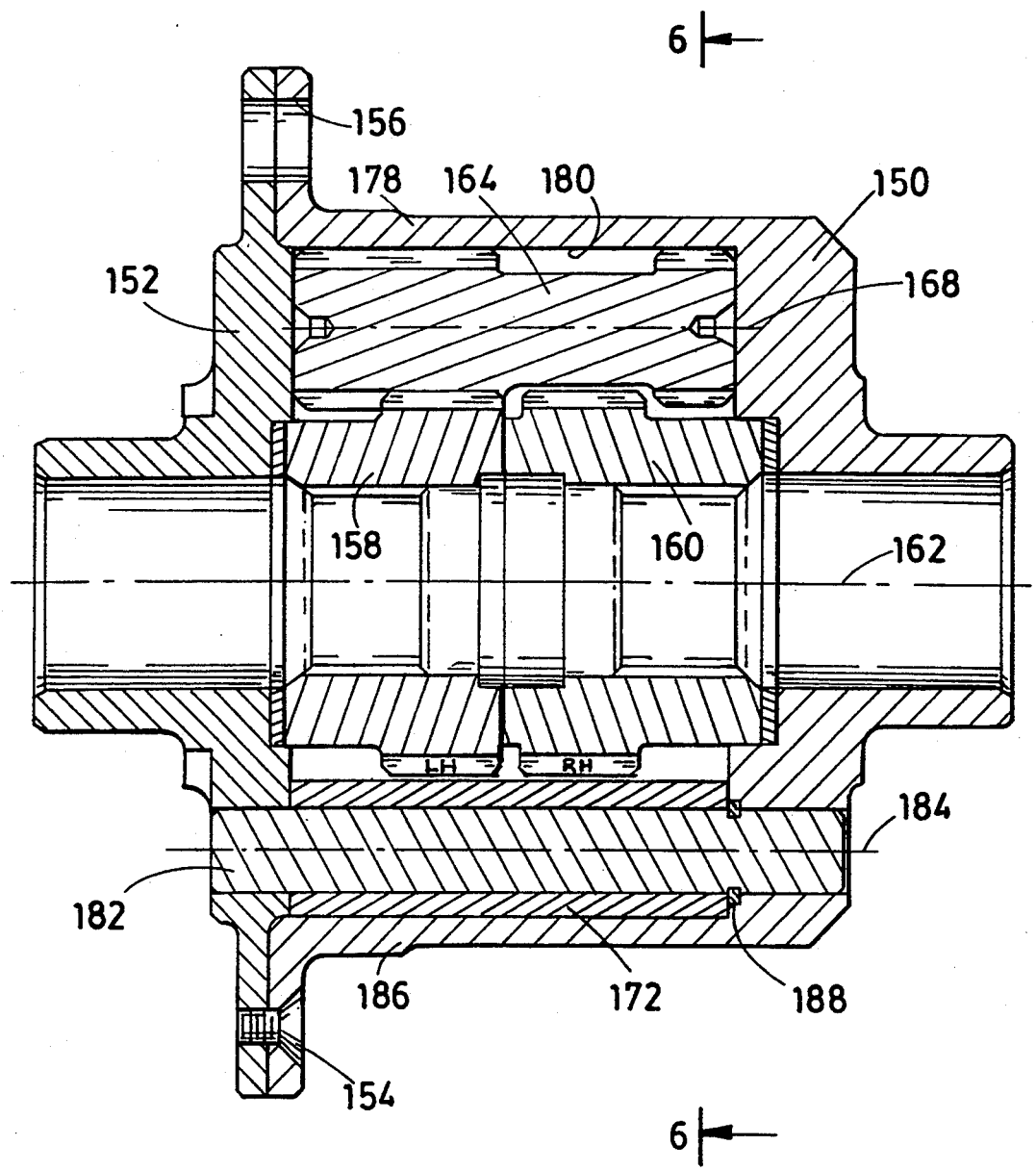
FIG. 5 is an axial cross-sectional view along line 5—5 of FIG. 6 showing a third embodiment of my gear mounting system having pivotable pedestals within a cylindrical casing.
Figure 6:
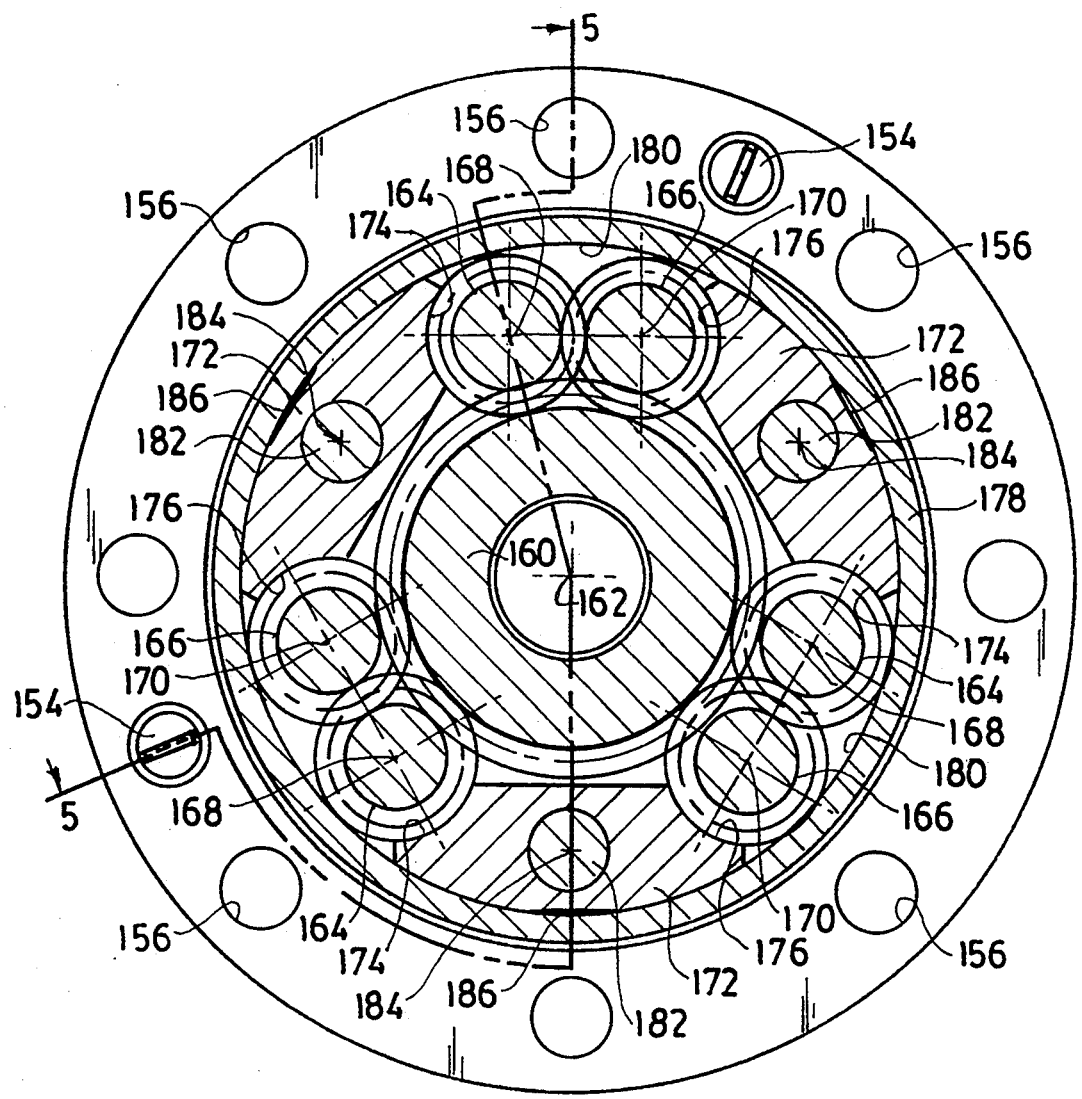
FIG. 6 is a transverse cross-sectional view of the same gear differential along line 6—6 of FIG. 5.

FIGS. 5 and 6 illustrate an alternative arrangement of my gear mounting system that can also be used to better control bias ratios of parallel-axis gear differentials. A housing assembly of the alternative arrangement includes a main body 150 and a mating flange 152 held together by screws 154. In addition, mounting holes 156 through the flange 152 and the mating portion of the main body 150 provide clearance for bolting a ring gear (not shown) together with both the main body 150 and the flange 152.

Side gears 158 and 160 are positioned within the main body 150 for rotation with a pair of drive shafts (not shown) about a common axis 162. Three pairs of planet gears, each having members 164 and 166, operatively connect the side gears 158 and 160 for rotation in opposite directions with respect to the housing assembly. The planet gear members 164 and 166 are rotatable about respective axes 168 and 170 that extend parallel to the common axis 162.

Similar to the preceding embodiments, the pairs of planet gear members 164 and 166 are rotatively supported between adjacent pedestals 172 that include respective bearing surfaces 174 and 176 for supporting outside cylinder surfaces of the planet gears 164 and 166. However, the outside cylinder surfaces of the planet gear members 164 and 166 are also supported by a cylindrical bearing surface 180 within a casing portion 178 of the main body 150. The cylindrical bearing surface 180 is preferably made of a material different from the main body 150 and the mating flange 152 to increase wear resistance of the cylindrical bearing surface 180.

The pedestals 172 are mounted on pins 182 having axes 184 that extend parallel to both the common axis 162 and the planet gear axes 168 and 170. The casing portion 178 provides clearance for opposite ends of the pedestals 172. In addition, clearance spaces 186 between the pedestals 172 and the cylindrical bearing surface 180 of the casing portion permit the pedestals to pivot through limited angular amounts about the pin axes 184. Snap-lock washers 188 hold the pins 182 in place within the main body 150.

Pivotal movement of the pedestals 172, which is imparted by unequal planetary gear thrust forces, urges the planet gear members 164 and 166 into positions of zero backlash. Preferably, movement of one of the planet gear members 164 or 166 is restrained by both the bearing surface 174 or 176 of one of the pedestals and the bearing surface 180 of the casing portion, and movement of the other of the planet gear members 164 or 166 is restrained by both the other of the bearing surfaces 174 or 176 and one of the side gears 158 and 160. Frictional resistance to rotation of the planet gear members 164 and 166 can be adjusted by varying either the surface curvatures of the pedestal bearing surfaces 174 and 176 or the position of the pins 182.

Figure 7:
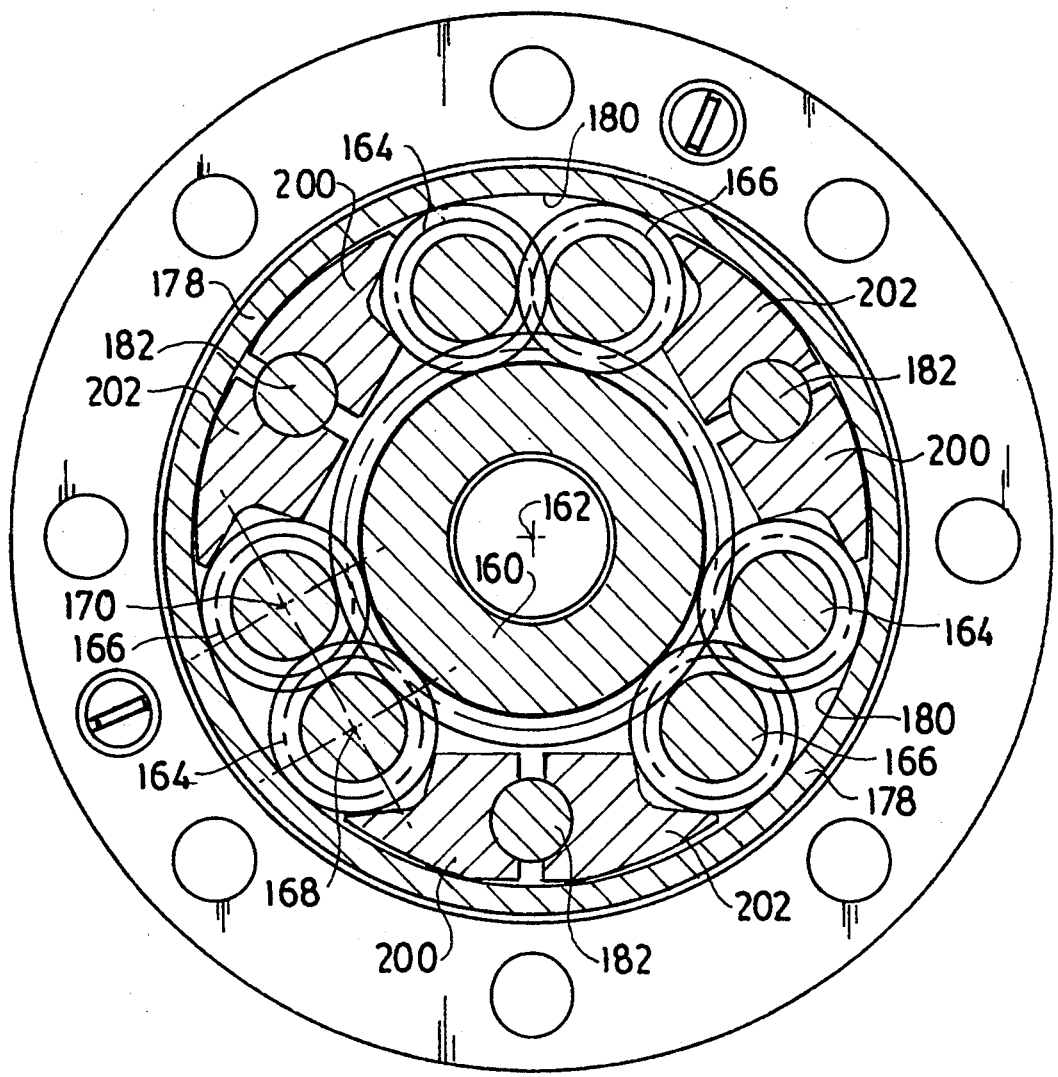
FIG. 7 is a similar transverse cross-sectional view of a fourth embodiment of my gear mounting system showing modified pedestals that have two relatively movable portions.
Figure 8:
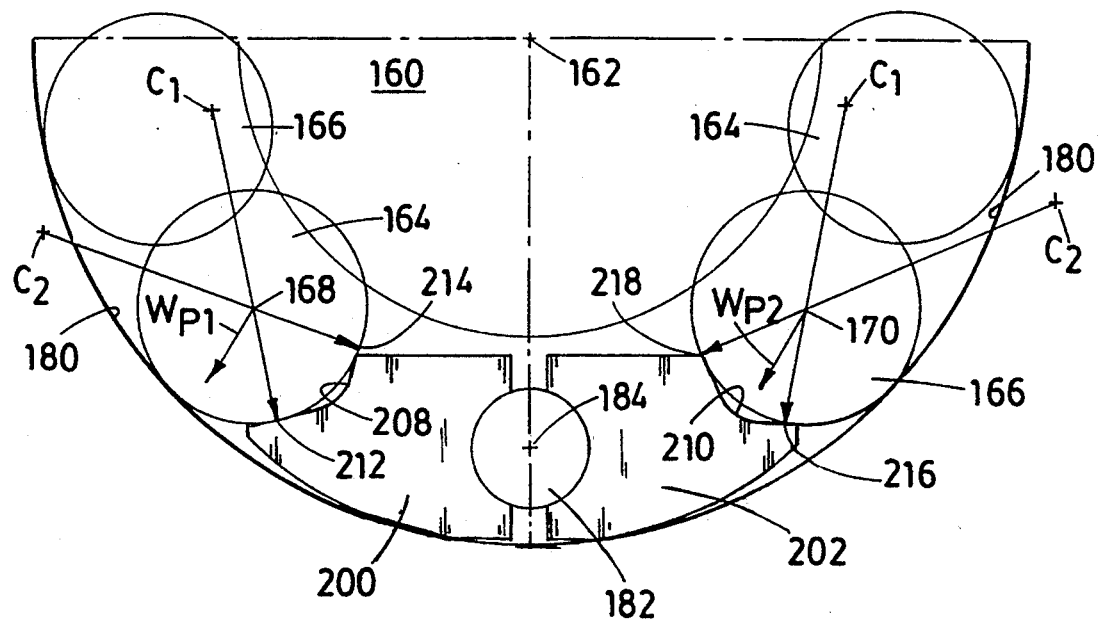
FIG. 8 is a schematic representation of an axial sectional view through a portion of the gear mounting system of FIG. 7 showing reactions between the planet gears and the two relatively movable pedestal portions.
Figure 9:
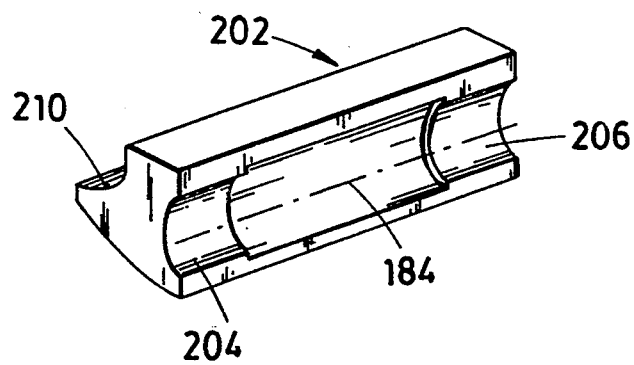
FIG. 9 is a perspective view of one of the relatively movable pedestal portions.

FIGS. 7–9 illustrate a modification of the embodiment of FIGS. 5 and 6 to provide more flexibility for raising frictional resistance to differentiation. Common elements of both embodiments are denoted by the same reference numerals.

Each of the pedestals is divided into two pedestal leg portions 200 and 202 that are independently pivotable about the pins 182. However contact between the pins 182 and the pedestal leg portions 200 and 202 is limited to inner bearing surfaces 204 and 206 that are located at opposite ends of the pedestal portions. The spaced inner bearing surfaces 204 and 206 limit bending moments on the pins 182 and provide more stable interfaces between the pins 182 and the pedestal leg portions 200 and 202.

Outer bearing surfaces 208 and 210 of the pedestal leg portions 200 and 202 encompass limited portions of the outside cylinder surfaces of the planet gear members 164 and 166. However, each of the outer bearing surfaces 208 and 210 has two different centers of curvature "$C_1$" and "$C_2$" for better controlling positions of contact between the outer bearing surfaces 208 and 210 and the outside cylinder surfaces of the planet gear members 164 and 166. For example, the outer bearing surface 208 contacts the outside cylinder surface of the planet gear member 164 at points 212 and 214, and the outer bearing surface 210 contacts the outside cylinder surface of the planet gear member 166 at points 216 and 218.

The gear thrust forces $W_{p1}$ and $W_{p2}$ pivot the pedestal leg portions 200 and 202 in opposite directions for pinching the outside cylinder surfaces of the planet gear members 164 and 166 against the cylindrical bearing surface 180 of the casing portion. The two curvatures $C_1$ and $C_2$ and the position of the pivot pins 184 can be varied to control the frictional resistance to rotation of the planet gear members 164 and 166.

Similar modifications can also be made to the preceding embodiments to further control bias ratios. For example, the position of the pins rotationally supporting the pedestals could be offset to vary leverage between the planet gear members. In addition, the pedestal bearing surfaces could be modified to contact two limited portions of the planet gear face widths to further control contact between the planet gear members and the pedestal bearing surfaces.

Although the invention is specially suited for use in parallel-axis gear differentials that have planet gears with two different gear portions, similar advantages are possible from use in other types of parallel-axis gear differentials, including such differentials having planet gears with only one gear portion.

I claim:

1. A gear differential comprising:
   a housing rotatable about a common axis of a pair of drive shafts;
   a pair of side gears positioned within said housing for rotation with the drive shafts;
   pairs of planet gears positioned within said housing in engagement with said side gears for rotation about respective axes;
   pedestals forming portions of said housing in positions that are spaced apart from each other between said pairs of planet gears;
   each of said pedestals having a first bearing surface rotationally supporting a circumference of a first member of said planet gear pairs and a second bearing surface rotationally supporting a circumference of a second member of an adjacent planet gear pair; and
   said pedestals being spaced apart along an entire length of said planet gears by windows formed through said housing.

2. The differential of claim 1 in which said first and second bearing surfaces encompass less than one-half of said circumferences of the planet gear members.

3. The differential of claim 2 in which said first bearing surface contacts said circumference of the first planet gear member in a position that produces a reactionary force that is angularly inclined to a radial direction of said first planet gear member movement apart from said side gears.

4. The differential of claim 1 in which said pedestals are pivotable about respective axes that extend parallel to said planet gear axes.

5. The differential of claim 4 in which said pedestals are pivotable in directions that move said first and second planet gear members of each pair into mesh with each other at zero backlash.

6. The differential of claim 5 in which said pedestals are pivotable in directions that move one of said first and second planet gear members of each pair into mesh with one of said side gears at zero backlash.

7. The differential of claim 1 in which said housing includes a middle section and two end sections, and said pedestals are formed within said middle section for transmitting power between said planet gears and said housing.

8. The differential of claim 7 in which said pedestals and said two end sections are made of different materials for increasing wear resistance of said pedestals.

9. A gear differential comprising:
   a housing rotatable about a common axis of a pair of drive shafts;
   a pair of side gears positioned within said housing for rotation with the drive shafts;
   pairs of planet gears positioned within said housing in engagement with said side gears for rotation about respective axes;
   pedestals forming portions of said housing in positions that are spaced apart from each other between said pairs of planet gears;
   each of said pedestals having a first bearing surface rotationally supporting a circumference of a first member of said planet gear pairs and a second bearing surface rotationally supporting a circumference of a second member of an adjacent planet gear pair;
   said housing including a middle section and two end sections, and said pedestals being formed within said middle section for transmitting power between said planet gears and said housing;
   said middle section also including a casing surrounding said pedestals having a cylindrical bearing surface for further rotationally supporting said circumferences of the first and second planet gear members; and
   said pedestals being pivotable about respective pivot axes that extend parallel to said planet gear axes, and clearance spaces between said pedestals and said cylindrical bearing surface of said casing limiting angular movements of said pedestals about said pivot axes.

10. The differential of claim 9 in which said cylindrical bearing surface of said casing and said two end sections are made of different materials for increasing wear resistance of said cylindrical bearing surface.

11. A parallel-axis gear differential assembly comprising:
    a housing rotatable about a common axis of a pair of drive shafts;
    a pair of side gears positioned within said housing for rotation with the drive shafts;
    pairs of planet gears positioned within said housing in engagement with said side gears for rotation about respective axes that extend parallel to said common axis of rotation;
    pedestals having respective bearing surfaces for rotationally supporting circumferences of said planet gears; and
    said pedestals being pivotable about respective axes that also extend parallel to said common axis.

12. The assembly of claim 11 in which said pedestals are pivotable in directions that move the planet gears of each of said pairs into mesh with each other at zero backlash.

13. The assembly of claim 12 in which said housing includes a casing portion surrounding said pedestals having a cylindrical bearing surface for further rotationally supporting said circumferences of the planet gears and said pedestals are pivotable in directions that move one of said planet gears of each pair against said cylindrical bearing surface of the casing portion.

14. The assembly of claim 13 in which said pedestals are pivotable in directions that move the other of said planet gears of each pair into mesh with one of said side gears at zero backlash.

15. The assembly of claim 11 in which said pedestals are formed with individually pivotable legs having respective bearing surfaces for separately supporting said circumferences of the planet gears of each pair.

16. The assembly of claim 15 in which each of said respective bearing surfaces of the individually pivotable legs includes two different centers of curvature for supporting said circumferences of the planet gears in predetermined positions.

17. A gear mounting system for increasing bias ratio in a differential comprising:
- a housing rotatable about a common axis of a pair of drive shafts;
- a pair of side gears mounted within said housing for rotation with the drive shafts;
- pairs of planet gears mounted within said housing in engagement with said side gears for rotation about respective axes;
- pedestals having respective bearing surfaces for rotationally supporting circumferences of said planet gears; and
- at least one of said respective bearing surfaces encompassing limited portions of said planet gear circumferences for producing reactionary forces that are angularly inclined to radial directions of planet gear movement apart from said side gears.

18. The system of claim 17 in which said reactionary forces urge the planet gears of each of said pairs into positions of zero backlash.

19. The system of claim 18 in which said respective bearing surfaces encompass less than one-half of said planet gear circumferences.

20. The system of claim 19 in which said pedestals are formed in said housing in positions that are spaced apart from each other between said pairs of planet gears.

21. The system of claim 20 in which said pedestals are spaced apart through openings in said housing that provide access for lubricant to said respective bearing surfaces.

22. The system of claim 21 in which said pedestals are fixed against rotation with respect to said housing.

23. The system of claim 17 in which said pedestals are pivotable about respective axes that extend parallel to said planet gear axes.

24. The system of claim 23 in which said pedestals are pivotable in directions that move the planet gears of each of said pairs into mesh with each other at zero backlash.

25. The system of claim 24 in which said pedestals are formed with individually pivotable legs for separately engaging the planet gears of each pair.

* * * * *